(12) United States Patent
Dudley

(10) Patent No.: US 11,493,687 B1
(45) Date of Patent: Nov. 8, 2022

(54) CRYOGENIC MICROFLUIDIC COOLING FOR PHOTONIC INTEGRATED CIRCUITS

(71) Applicant: Psiquantum, Corp., Palo Alto, CA (US)

(72) Inventor: Eric Dudley, Sacramento, CA (US)

(73) Assignee: PSIQUANTUM, CORP., Palo Alto, CA (US)

(*) Notice: Subject to any disclaimer, the term of this patent is extended or adjusted under 35 U.S.C. 154(b) by 29 days.

(21) Appl. No.: 16/920,055

(22) Filed: Jul. 2, 2020

Related U.S. Application Data

(60) Provisional application No. 62/869,912, filed on Jul. 2, 2019.

(51) Int. Cl.
*G02B 6/12* (2006.01)
*G01J 1/02* (2006.01)
*G01J 1/44* (2006.01)
*G02B 6/136* (2006.01)
*G06N 10/00* (2022.01)

(52) U.S. Cl.
CPC ........ *G02B 6/12004* (2013.01); *G01J 1/0204* (2013.01); *G01J 1/44* (2013.01); *G02B 6/136* (2013.01); *G06N 10/00* (2019.01); *G01J 2001/442* (2013.01); *G02B 2006/12135* (2013.01); *G02B 2006/12138* (2013.01)

(58) Field of Classification Search
CPC ................ G02B 6/12004; G02B 6/136; G02B 2006/12135; G02B 2006/12138; G01J 1/0204; G01J 1/44; G01J 2001/442; G02N 10/00
See application file for complete search history.

(56) References Cited

U.S. PATENT DOCUMENTS

| | | |
|---|---|---|
| 6,521,516 B2 | 2/2003 | Monzon et al. |
| 6,785,134 B2 | 8/2004 | Maveety et al. |
| 6,903,929 B2 | 6/2005 | Prasher et al. |
| 7,882,624 B2 | 2/2011 | Hu et al. |
| 8,269,341 B2 | 9/2012 | Barth |
| 8,441,723 B2 | 5/2013 | Rice et al. |
| 9,245,836 B2 | 1/2016 | Sadaka |
| 9,500,519 B2 | 11/2016 | Tang et al. |

(Continued)

OTHER PUBLICATIONS

"Higher Processor Performance with Microchannel Cooler", Double the Cooling Effect, Fraunhofer, Research News, Oct. 2017, 3 pages.

(Continued)

*Primary Examiner* — Ryan A Lepisto
*Assistant Examiner* — Erin D Chiem
(74) *Attorney, Agent, or Firm* — Kilpatrick Townsend & Stockton LLP

(57) ABSTRACT

Techniques disclosed herein relate generally to photonic integrated circuits working at cryogenic temperatures. In one example, a device includes a substrate, a dielectric layer on the substrate, an optical waveguide in the dielectric layer, a superconducting circuit in the dielectric layer and coupled to the optical waveguide, and a micro-channel in the dielectric layer and adjacent to the superconducting circuit. The micro-channel is aligned with the superconducting circuit and is configured to conduct a liquid at a cryogenic temperature to locally cool the superconducting circuit.

15 Claims, 16 Drawing Sheets

(56) References Cited

U.S. PATENT DOCUMENTS

| | | |
|---|---|---|
| 2005/0205241 A1 | 9/2005 | Goodson et al. |
| 2005/0287696 A1 | 12/2005 | Dumais et al. |
| 2007/0254411 A1* | 11/2007 | Uhland .............. H01L 23/5389 |
| | | 438/127 |
| 2009/0056917 A1* | 3/2009 | Majumdar ............ F28D 15/046 |
| | | 165/104.26 |
| 2009/0174407 A1 | 7/2009 | Han et al. |
| 2010/0155932 A1 | 6/2010 | Gambino et al. |
| 2014/0299751 A1* | 10/2014 | Tang .................... G01J 1/0425 |
| | | 250/227.11 |

OTHER PUBLICATIONS

L. Andricek et al., "Micro-channel Cooling for Silicon Detectors", Forum on Tracking Detector Mechanics, May 23, 2016, 29 pages.

Beysengulov, et al., "Transport of Electrons on Liquid Helium in a Microchannel Device near the Current Threshold", Available Online at: https://www.researchgate.net/publication/308091684_Transport_of_electrons_on_liquid_helium_in_a_microchannel_device_near_the_current_threshold, Sep. 2016, 6 pages.

Flaherty, "New microchannel Design Drives 3D Chip Cooling to New Record", Available online at: http://www.eenewspower.com/news/new-microchannel-design-drives-3d-chip-cooling-new-record, Oct. 26, 2017, 2 pages.

Gaikwad, "Microchannel Heat Sink Fabrication Techniques", IOSR Journal of Mechanical and Civil Engineering (IOSR-JMCE), pp. 51-57.

* cited by examiner

CRYOGENIC MICROFLUIDIC COOLING FOR PHOTONIC INTEGRATED CIRCUITS

CROSS-REFERENCE TO RELATED APPLICATION

This patent application claims priority to U.S. Provisional Patent Application Ser. No. 62/869,912, filed Jul. 2, 2019, entitled "Cryogenic Microfluidic Cooling For Photonic Integrated Circuits," the disclosure of which is hereby incorporated by reference in its entirety for all purposes.

BACKGROUND

Photonic integrated circuits having high sensitivity, such as single photon detectors, may be used in many photonic quantum technologies, such as quantum cryptography and quantum computing. One class of single photon detectors are superconducting nanowire single photon detectors (SNSPDs). An SNSPD includes a nanowire and can detect photons based on the transition of the nanowire from a superconductive state to a resistive state upon absorption of a single photon. For the nanowire to be in the superconductive state, it may need to operate in a low temperature environment, such as at a cryogenic temperature (e.g., less than about 5 Kelvin).

SUMMARY

Techniques disclosed herein relate generally to cooling a photonic integrated circuit, such as a superconducting nanowire single photon detector, to low temperatures, such as cryogenic temperatures. In one embodiment, a device may include a substrate, a dielectric layer on the substrate, an optical waveguide in the dielectric layer, a superconducting circuit in the dielectric layer and coupled to the optical waveguide, and a micro-channel in the dielectric layer and adjacent to the superconducting circuit. The micro-channel may be aligned with the superconducting circuit and may conduct a liquid at a cryogenic temperature to locally cool the superconducting circuit. Various inventive embodiments are described herein, including methods, processes, systems, devices, and the like.

In some embodiments, the superconducting circuit may include a photosensitive nanowire. In some embodiments, the photosensitive nanowire may include a niobium nitride nanowire, a niobium germanium nanowire, or a niobium titanium nitride nanowire. The superconducting circuit and the optical waveguide may be parts of a single-photon detector. The superconducting circuit may be characterized by a superconducting temperature at or below 4 kelvin and/or a thickness less than 10 nm. A distance between the micro-channel and the superconducting circuit may be less than 1 µm. The micro-channel may have a cross-sectional area greater than 10 µm$^2$ and may be characterized by a width that is at least twice of a width of the superconducting circuit.

In accordance with some embodiments, a method may include fabricating a device including a first dielectric layer, an optical waveguide in the first dielectric layer, and a superconducting circuit in the first dielectric layer and on the optical waveguide; forming a sacrificial structure on the first dielectric layer and aligned with the superconducting circuit; depositing a second dielectric layer on the sacrificial structure; cutting an opening in the second dielectric layer to expose the sacrificial structure; wet etching the sacrificial structure through the opening; and sealing the opening in the second dielectric layer with a third dielectric layer to form a micro-channel between the first dielectric layer and the second dielectric layer.

In some embodiments, the superconducting circuit may be characterized by a thickness less than 10 nm, a distance between the micro-channel and the superconducting circuit may be less than 1 µm, and a width of the micro-channel may be at least twice of a width of the superconducting circuit. In some embodiments, the method may also include etching the second dielectric layer and the third dielectric layer to form a deep trench in the device and to expose an input port of the micro-channel, bonding a base plate to a carrier, and bonding the device to the base plate in the carrier. In some embodiments, the base plate may include a channel and a deep trench, and the deep trench in the base plate may be aligned with the deep trench in the device.

According to certain embodiments, a system may include a housing including an input port and an output port, a base plate in the housing and including a first micro-channel connected to the input port of the housing, and a photonic integrated device bonded to the base plate. The photonic integrated device may include a superconducting circuit, a second micro-channel adjacent to and aligned with the superconducting circuit and connected to the output port of the housing, and a trench in fluidic communication with the input port of the housing through the first micro-channel and in fluidic communication with the output port of the housing through the second micro-channel. The first micro-channel, the trench, and the second micro-channel may be configured to conduct a liquid at a cryogenic temperature from the input port to the output port of the housing.

In some embodiments, a distance between the second micro-channel and the superconducting circuit may be less than 1 µm. The base plate may include a silicon substrate. In some embodiments, the base plate may include a cut-out region aligned with the trench in the photonic integrated device, the cut-out region and the trench forming a reservoir for storing the liquid at the cryogenic temperature. In some embodiments, the photonic integrated device may be fusion-bonded to the base plate to form a sealed conduit from the input port to the output port of the housing. In some embodiments, the housing may include a ceramic package. In some embodiments, the photonic integrated device may also include an optical waveguide adjacent to and aligned with the superconducting circuit, the optical waveguide and the superconducting circuit forming parts of a superconducting nanowire single photon detector.

Numerous benefits can be achieved by way of the present invention over conventional techniques. For example, techniques disclosed herein can be used to locally cool a particular circuit in a system, where only the particular circuit needs to operate at very low temperature, such as cryogenic temperatures, rather than globally cooling the whole system. Therefore, the cooling techniques disclosed herein can increase cooling efficiency and speed, reduce coolant and energy consumption, and allow the system to operate at higher ambient temperature with local cold spots.

BRIEF DESCRIPTION OF THE DRAWINGS

Aspects of the present disclosure are illustrated by way of example. Non-limiting and non-exhaustive aspects are described with reference to the following figures, where like reference numerals refer to like parts throughout the various figures unless otherwise specified.

DETAILED DESCRIPTION

Figure 1:
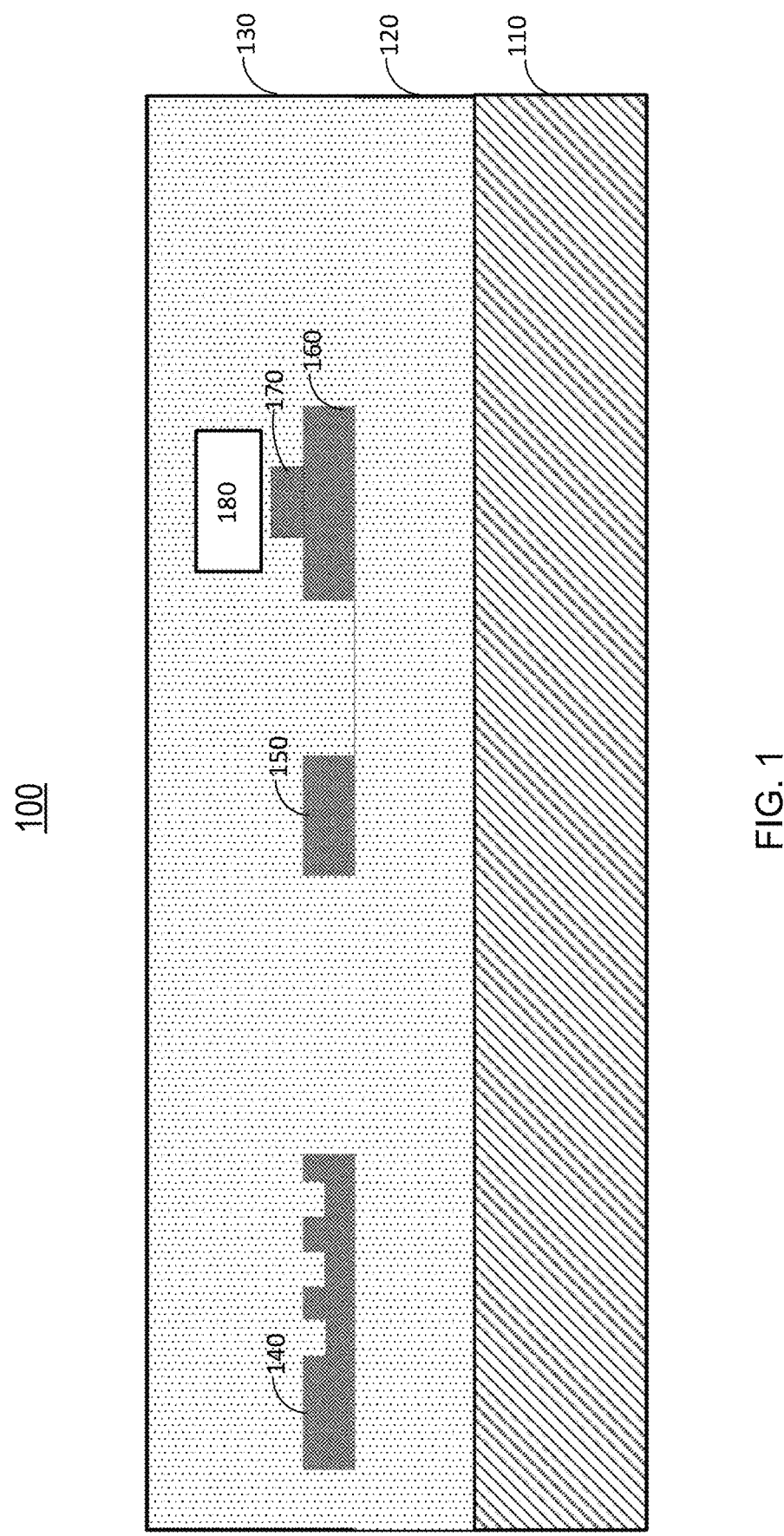
FIG. 1 is a cross-sectional view of an example of a photonic integrated circuit including a photodetector and a micro-channel adjacent to the photodetector according to certain embodiments.

Techniques disclosed herein relate generally to cooling a photonic integrated circuit, such as a superconducting nanowire single photon detector, to low temperatures, such as cryogenic temperatures. According to certain embodiments, in a larger scale device or system, micro-channels may be manufactured adjacent to particular circuits that need to operate at a low temperature. The micro-channels may conduct cooling fluid at cryogenic temperatures to locally cool the particular circuits, rather than globally cooling the whole device or system. Various inventive embodiments are described herein, including methods, processes, systems, devices, and the like.

Many high sensitivity and/or high speed photonic integrated circuits, such as a photonic quantum computer including single photon generators and single photon detectors, may need to operate at low temperatures to achieve the low noise and high speed. For example, a superconducting nanowire single photon detector (SNSPD) may include a nanowire operating at a superconductive state and may detect photons based on a transition of the nanowire from the superconductive state to a resistive state upon absorption of a single photon. The nanowire may generally need to operate in a low temperature environment, such as cryogenic temperatures (e.g., less than about 5 Kelvin), in order to operate in the superconductive state. However, it can be challenging to operate the whole or even a portion of a photonic quantum computer at a cryogenic temperature.

According to certain embodiments, micro-channels can be etched using CMOS fabrication processes to provide targeted local cooling to certain areas of an integrated circuit that are operated at cryogenic temperatures. In some embodiments, a sacrificial structure can be formed directly above certain areas of the integrated circuit, such as areas where a single photon detector (e.g., SNSPD) is located, and can be removed later in the fabrication processes to create a micro-channel above and adjacent to the certain areas of the integrated circuit. The micro-channel may conduct a coolant at cryogenic temperature, such as liquid helium. Because the thermal resistance between the single photon detector and the coolant can be significantly decreased due to the close proximity of the coolant, the heat flow can be improved and the amount of cooling and coolant used to maintain a superconductive state for the single photon detector can be reduced.

Several illustrative embodiments will now be described with respect to the accompanying drawings. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

Quantum photonic circuits, such as photonic quantum computing and photonic quantum communication systems, may use highly sensitive photodetectors, such as single photon detectors that can detect individual photons. One example of the single photon detector is a superconducting nanowire single photon detector (SNSPD). A superconducting nanowire single photon detector may include a superconducting nanowire, such as a niobium-germanium or niobium-nitride nanowire, which may have an ultralow resistance in the superconductive state. The superconducting nanowire can be photosensitive or photoactive, such as absorptive for photons. The superconducting nanowire may be coupled to a waveguide to detect photons propagating in the waveguide. For example, photons propagating in the waveguide may be absorbed by the superconducting nanowire, which may cause the superconducting nanowire to become non-superconducting (e.g., changing resistance or impedance). The resistance or impedance change in the nanowire may be converted into an electrical detection signal (e.g., a current or voltage signal) that indicates one or more photons are detected. After the photon is absorbed, the superconductivity may be recovered in the nanowire within a short time period and the SNSPD may be ready to detect the next photon. To be in the superconductive state when no photons are absorbed, the nanowire may need to operate at cryogenic temperatures, such as lower than 5 Kelvin, 4 Kelvin, 2.5 Kelvin, or lower.

FIG. 1 is a cross-sectional view of an example of a photonic integrated circuit (PIC) 100 including a photodetector and a micro-channel 180 adjacent to the photodetector according to certain embodiments. PIC 100 may be manufactured using front end of line CMOS processes. In the example shown in FIG. 1, PIC 100 may include a substrate 110 (e.g., a silicon handle wafer), a barrier oxide (BOX) layer 120 (e.g., a silicon dioxide layer) formed on substrate 110, various devices (e.g., optical input/output coupler 140, waveguide 150, and the photodetector including a waveguide 160 and a nanowire 170) on a device layer, and an oxide layer 130 encapsulating the device layer. Oxide layer 130 and BOX layer 120 may act as the cladding of waveguide 150. In one example, oxide layer 130 may have a thickness of about 1 µm or higher. Optical input/output coupler 140 may include a grating coupler.

Nanowire 170 may include a superconducting material layer, such as niobium nitride (NbN) or NbTiN, sputtered on waveguide 160. Nanowire 170 may operate at cryogenic temperatures and may be in the superconductive state when no photon is absorbed by nanowire 170. A constant current below the critical current of the superconducting material may be applied to the photodetector. Nanowire 170 may be photoactive and may absorb photons propagating in waveguide 160 and temporarily become non-superconductive. Thus, a voltage pulse may be generated when a photon is absorbed by nanowire 170. Nanowire 170 may have a thickness, for example, about 10 nm or lower (such as 5 nm), and a width, for example, about 100 nm or lower (such as 50 nm). The nanoscale cross-section makes the photodetector extremely sensitive and able to response to the absorption of just a single photon.

Micro-channel 180 may be positioned adjacent to nanowire 170 and may be wider than nanowire 170. A coolant, such as liquid helium at a cryogenic temperature, may be conducted by micro-channel to conduct heat away from nanowire 170. For example, the liquid helium may be pumped from a reservoir (not shown) into micro-channel 180 and may flow in micro-channel 180 at a certain speed due to the pressure applied by the pump. The liquid helium may absorb heat from nanowire 170 and/or other adjacent circuits, such as electrically conducting wires.

Figure 2:
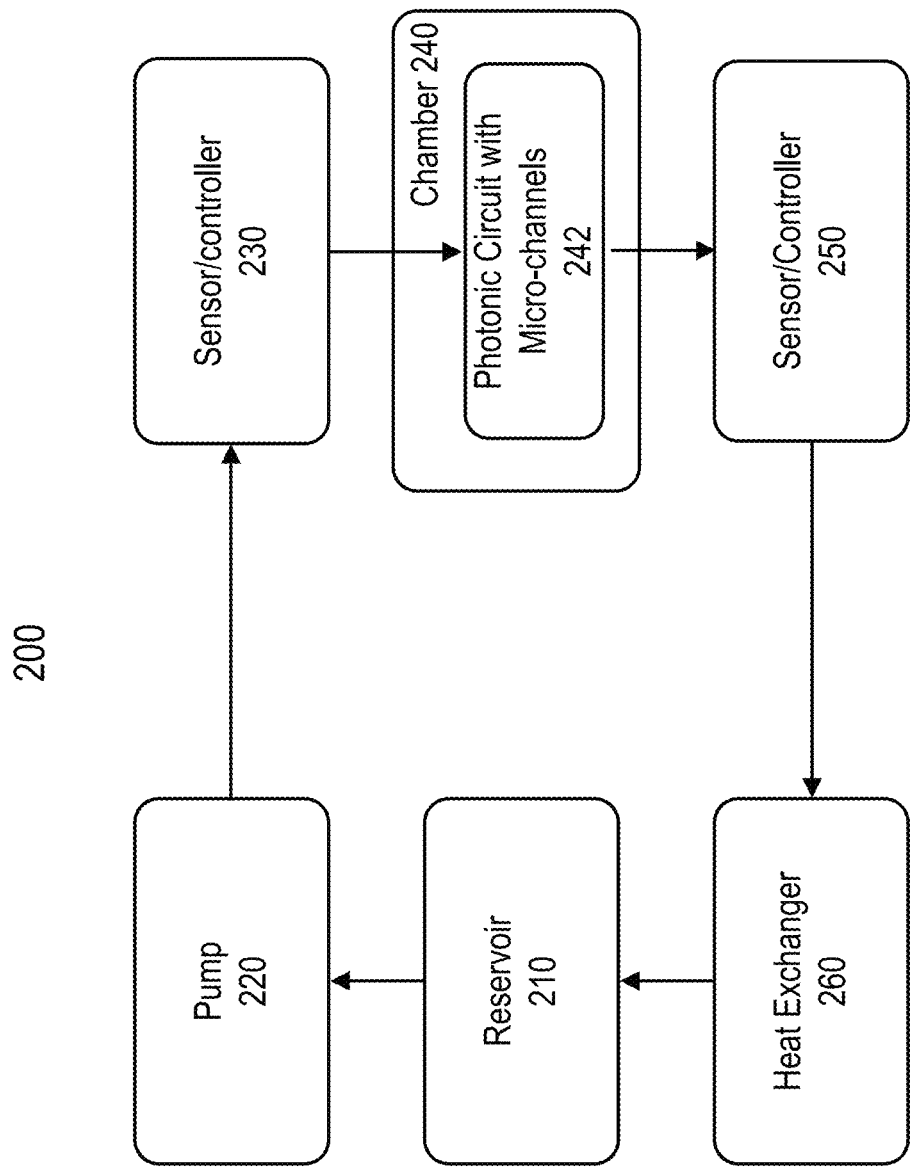
FIG. 2 illustrates an example of a system for cooling a photonic circuit using micro-channels according to certain embodiments.

FIG. 2 illustrates an example of a system 200 for cooling a photonic circuit, such as PIC 100, using micro-channels according to certain embodiments. System 200 may include a reservoir 210 configured to store a coolant, such as liquid helium at a cryogenic temperature. A pump 220 may pump the liquid helium from reservoir 210, through a sensor and/or controller 230, to a chamber 240. Sensor and/or controller 230 may be used to measure and control the temperature, speed or flow rate, and/or pressure of the liquid helium pumped into chamber 240.

A photonic circuit 242 with micro-channels, such as PIC 100, may be placed in chamber 240. Rather than immersing the whole photonic circuit 242 in the liquid helium in chamber 240, the liquid helium pumped into chamber 240 may be sent to the micro-channels and pass through the micro-channels. If the temperature of photonic circuit 242 surrounding the micro-channels is higher than the temperature of the liquid helium in the micro-channels, heat may be transferred to the liquid helium and taken away from photonic circuit 242 by the liquid helium.

The liquid helium may have a temperature increase after passing through the micro-channels in photonic circuit 242 and may flow out of chamber 240 towards reservoir 210 through a sensor/controller 250 and a heat exchanger 260. Sensor/controller 250 may be used to measure and control the temperature, speed or flow rate, and/or pressure of the liquid helium passing through chamber 240. Heat exchanger 260 may cool the liquid helium down to a lower, cryogenic temperature before sending the liquid helium into reservoir 210. In this way, the liquid helium in reservoir 210 may be recirculated through the micro-channels in chamber 240 to maintain the cryogenic temperature for circuits surrounding the micro-channels, such as the nanowires and/or other circuits of the single photon detectors.

As described above, locally cooling the superconducting circuits in a device or system may offer many advantages over global cooling of the device or system. However, it can be challenging to manufacture the micro-channels that have small sizes and can endure high pressure and operate at cryogenic temperatures.

Figure 3:
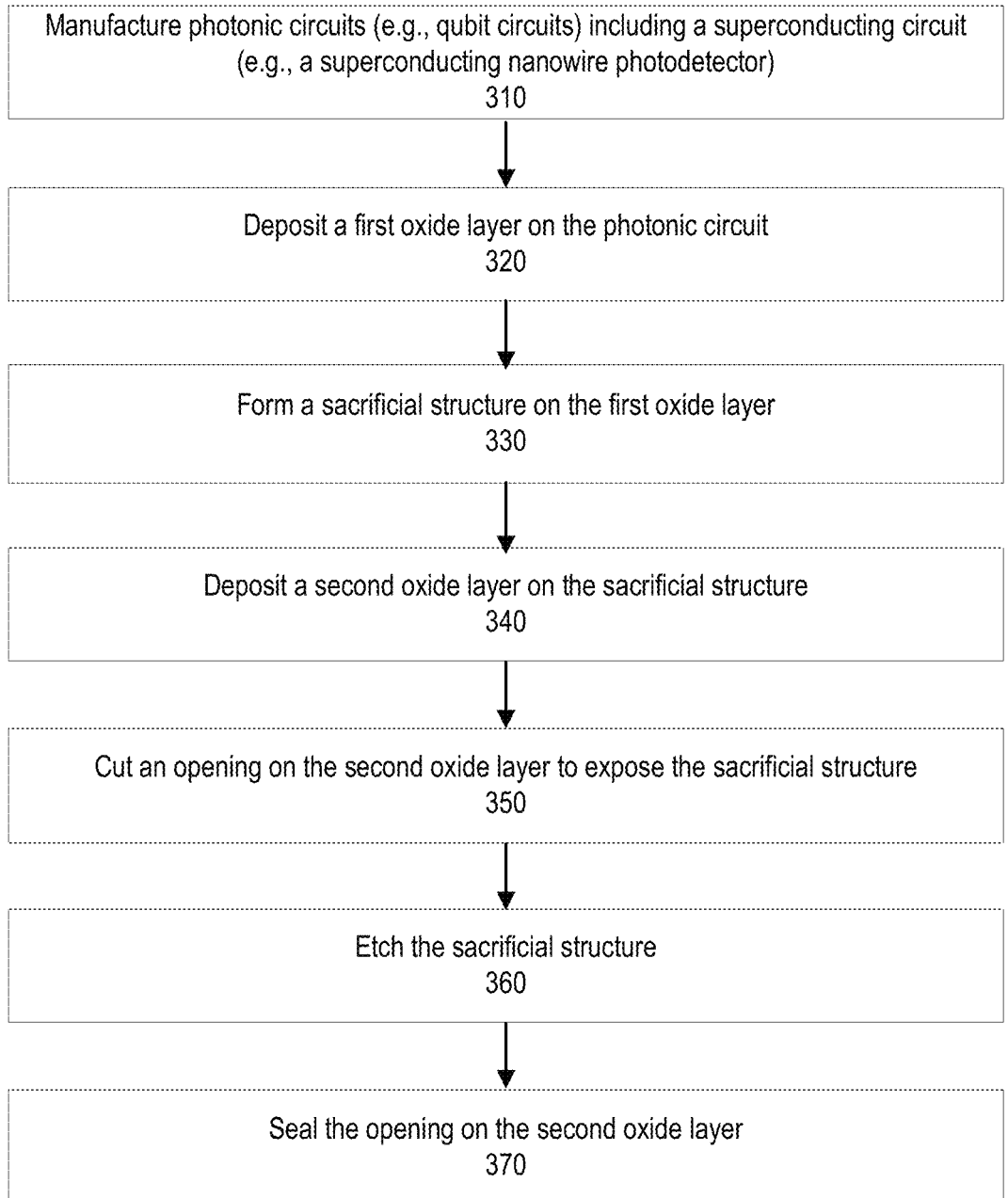
FIG. 3 is a flow chart illustrating an example of a method for fabricating a micro-channel in a photonic integrated circuit according to certain embodiments.

FIG. 3 is a flow chart 300 illustrating an example of a method for fabricating a micro-channel in a photonic integrated circuit, such as PIC 100, according to certain embodiments. It should be appreciated that the specific steps illustrated in FIG. 3 provide a particular method of fabricating micro-channels in photonic integrated circuits. Other sequences of steps may also be performed according to alternative embodiments. For example, alternative embodiments of the present invention may perform the steps outlined in FIG. 3 in a different order. Moreover, the individual steps illustrated in FIG. 3 may include multiple sub-steps that may be performed in various sequences as appropriate to an individual step. Furthermore, additional steps may be added or removed depending on the particular applications. One of ordinary skill in the art would recognize many variations, modifications, and alternatives.

At block 310, photonic circuits (e.g., qubit circuits) including a superconducting circuit (e.g., a superconducting nanowire photodetector) may be fabricated using semiconductor fabrication processes, such as CMOS fabrication processes. The photonic circuits may include various devices, such as waveguides, grating couplers, and photodetectors, in or on a dielectric layer (e.g., an oxide layer) formed on a substrate. The photodetectors may include superconducting nanowire single photon detectors as described above.

Figure 4:
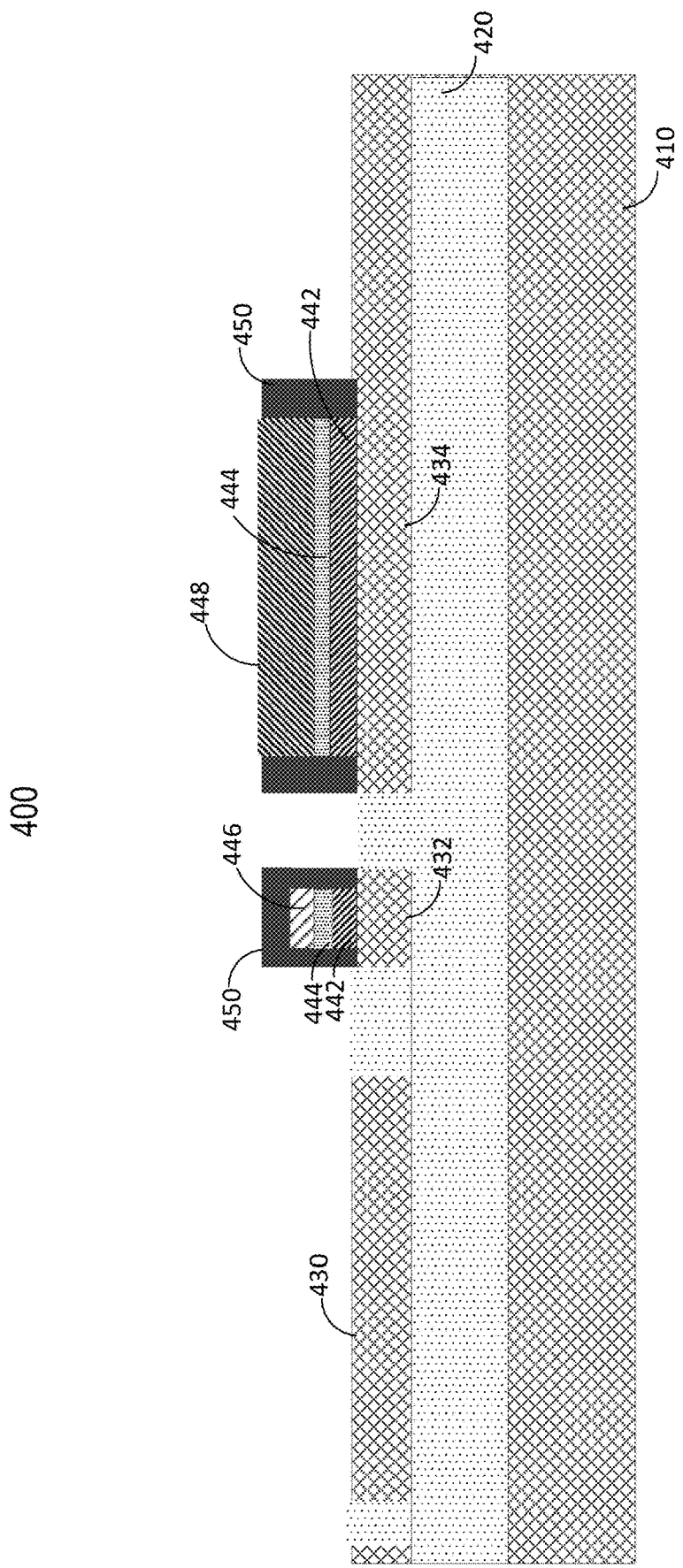
FIG. 4 is a cross-sectional view of an example of a photonic circuit including a superconducting circuit according to certain embodiments.

FIG. 4 is a cross-sectional view of an example of a photonic circuit 400 including a superconducting circuit, such as a superconducting nanowire single photon detector, according to certain embodiments. Photonic circuit 400 may be fabricated after the operations at block 310, and may include a substrate 410 (e.g., a silicon handle wafer), a barrier oxide (BOX) layer 420 (e.g., a silicon dioxide layer) formed on substrate 410, and various waveguide devices 430, 432, and 434 (e.g., optical input/output coupler and waveguide). The waveguide devices may include, for example, silicon waveguides.

A superconducting nanowire single photon detector may be formed on waveguide device 432. The SNSPD may include a seed layer 442, a superconducting material layer 444, and a capping layer 446. Seed layer 442 may include a single silicon layer and may be used to improve the adherence and matching between superconducting material layer 444 and waveguide device 432. Superconducting material layer 444 may include a thin nitride material layer, such as Nb(Ti)N, which may be deposited on seed layer 442 by, for example, sputtering. Capping layer 446 may include a high index dielectric material, such as $SiN_x$, which may reduce the permittivity mismatch between the superconducting material layer 444 and the surrounding materials. In some embodiments, a passivation layer 450 may be formed around the SNSPD. Passivation layer 450 may include, for example, polysilicon.

A contact region may be formed on waveguide 434. The contact region may be used to connect the SNSPD to a current or voltage source for supply current or voltage signal to the SNSPD and connect the SNSPD to a detection circuit that may generate pulse signals when photons are absorbed by the nanowire in superconducting material layer 444. The contact region may include seed layer 442, superconducting material layer 444, and a metal layer 448. Passivation layer 450 may also be formed on the sidewalls of the contact region.

At block 320, a first oxide layer may be deposited on the photonic circuit as described above with respect to FIG. 4. The first oxide layer may cover the SNSPD and the contact region described above, and may have a thickness that is equal to or slightly higher than the height of the SNSPD that includes seed layer 442, superconducting material layer 444, capping layer 446, and passivation layer 450. In some embodiments, a planarization process may be performed to planarize the top surface of the first oxide layer and/or reduce the thickness of the first oxide layer.

Figure 5:
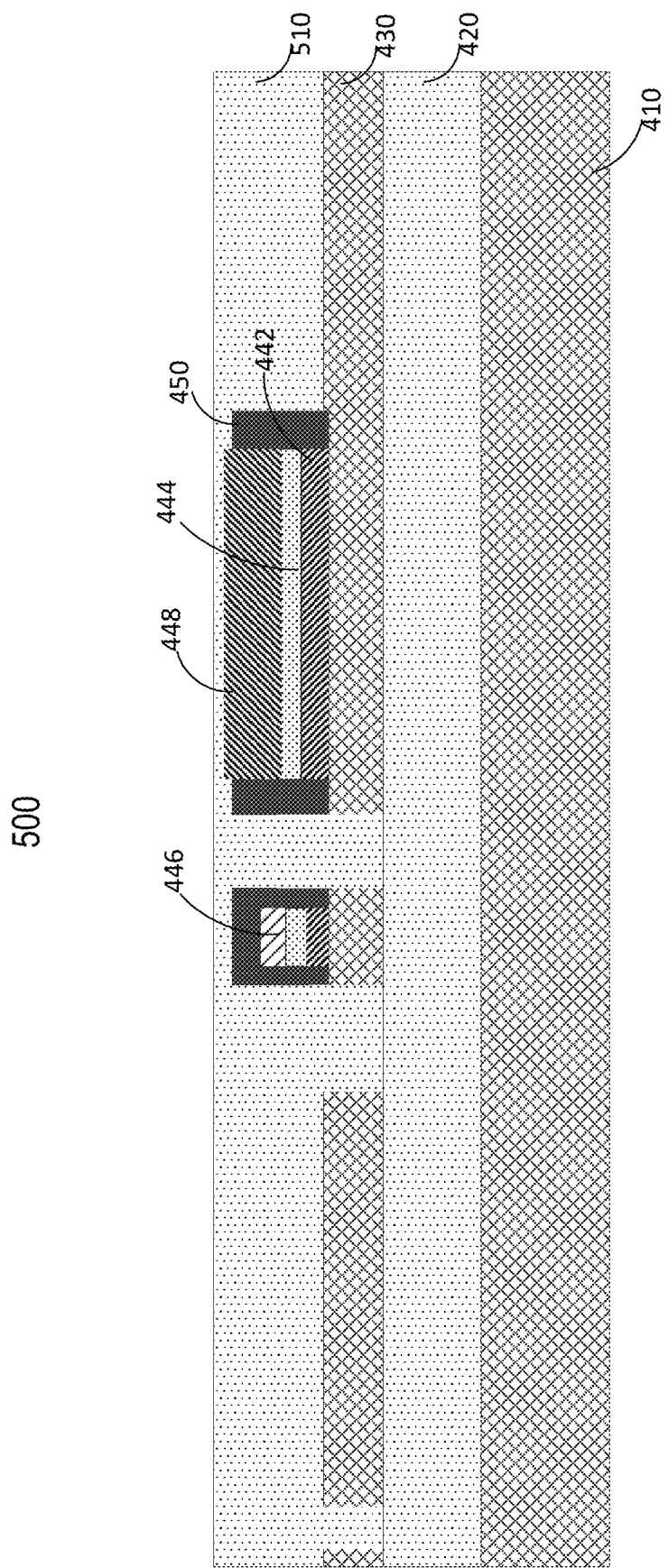
FIG. 5 is a cross-sectional view of an example of a photonic circuit with an oxide layer encapsulating a superconducting circuit according to certain embodiments.

FIG. 5 is a cross-sectional view of an example of a photonic circuit 500 with an oxide layer 510 encapsulating the superconducting circuit according to certain embodiments. Photonic circuit 500 may be fabricated from photonic circuit 400 after the processing at block 320. As shown in FIG. 5, oxide layer 510 may cover the SNSPD and the contact region described above, and may have a thickness that is equal to or slightly higher than the height of the SNSPD that includes superconducting material layer 444, capping layer 446, and passivation layer 450.

At block 330, a sacrificial structure may be formed on the first oxide layer. The sacrificial structure may be formed on the first oxide layer by, for example, deposition and photolithography. The sacrificial structure may include, for example, polysilicon, silicon nitride, phosphosilicate glass (PSG), polycarbonate or polynorbornene, metal (e.g., aluminum), or other materials that can be selectively wet etched.

Figure 6:
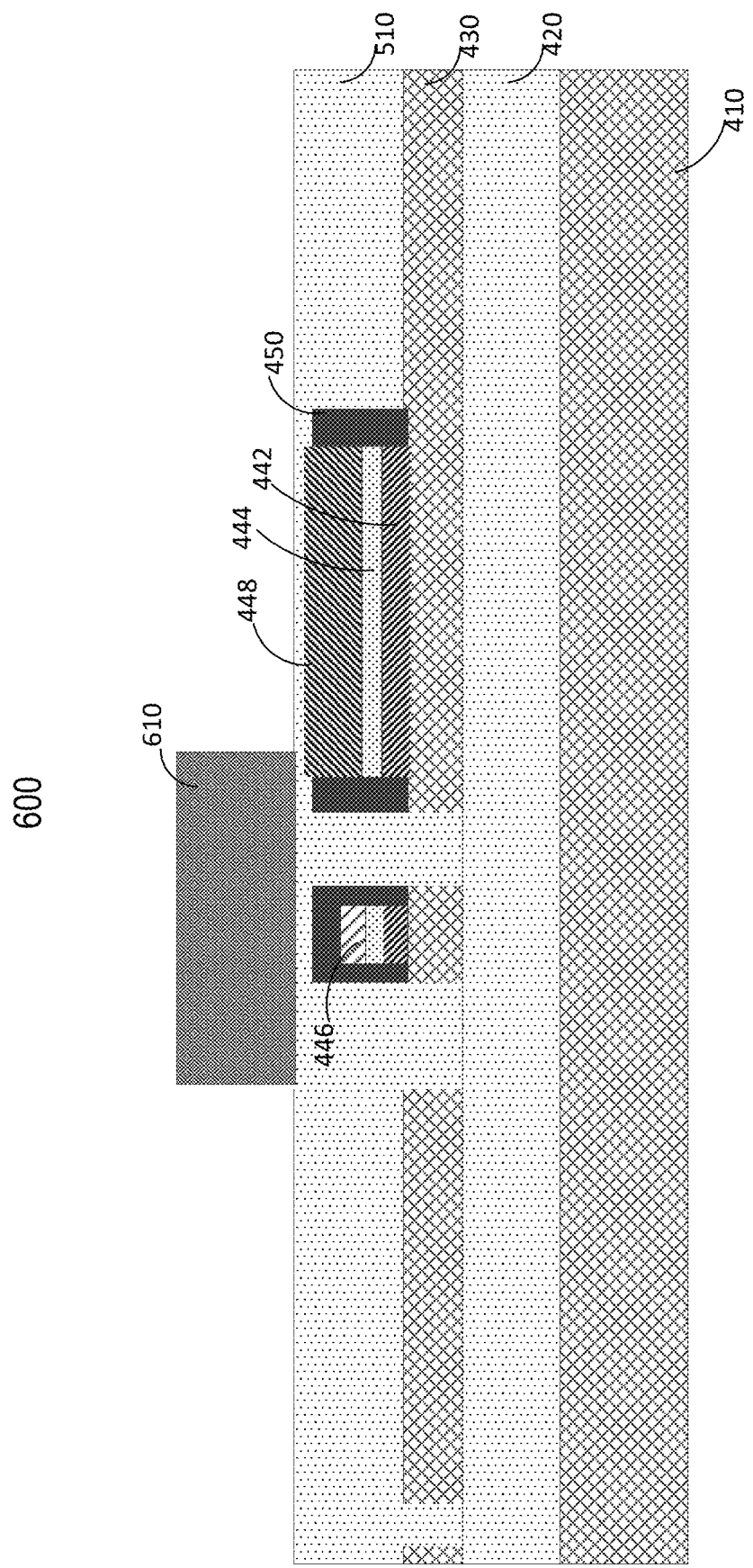
FIG. 6 is a cross-sectional view of an example of a photonic circuit with a sacrificial structure according to certain embodiments.

FIG. 6 is a cross-sectional view of an example of a photonic circuit 600 with a sacrificial structure 610 according to certain embodiments. Sacrificial structure 610 may include any material that can be selectively etched, for example, wet etched, as described above, and may be formed on top of oxide layer 510 using a photolithography technique. As illustrated, sacrificial structure 610 may be aligned with and formed on top of the superconducting nanowire of the SNSPD. Sacrificial structure 610 may have a width greater than the width of the superconducting nanowire. For example, sacrificial structure 610 may have a width about a few micrometers, such as about 10 μm. Sacrificial structure 610 may have a thickness that is sufficiently large such that the cross-sectional area of sacrificial structure 610 can be sufficiently large, and thus the micro-channel formed after the sacrificial layer is removed can be large enough for conducting a coolant at a desired flow rate. For example, sacrificial structure 610 may have a thickness greater than about one micrometer, such as about 2 μm.

At block 340, a second oxide layer may be formed on the sacrificial structure. The second oxide layer may be thick enough to bury or encapsulate the sacrificial structure. The second oxide layer may include, for example, $SiO_2$, and may be formed on the sacrificial structure using various deposition techniques.

Figure 7:
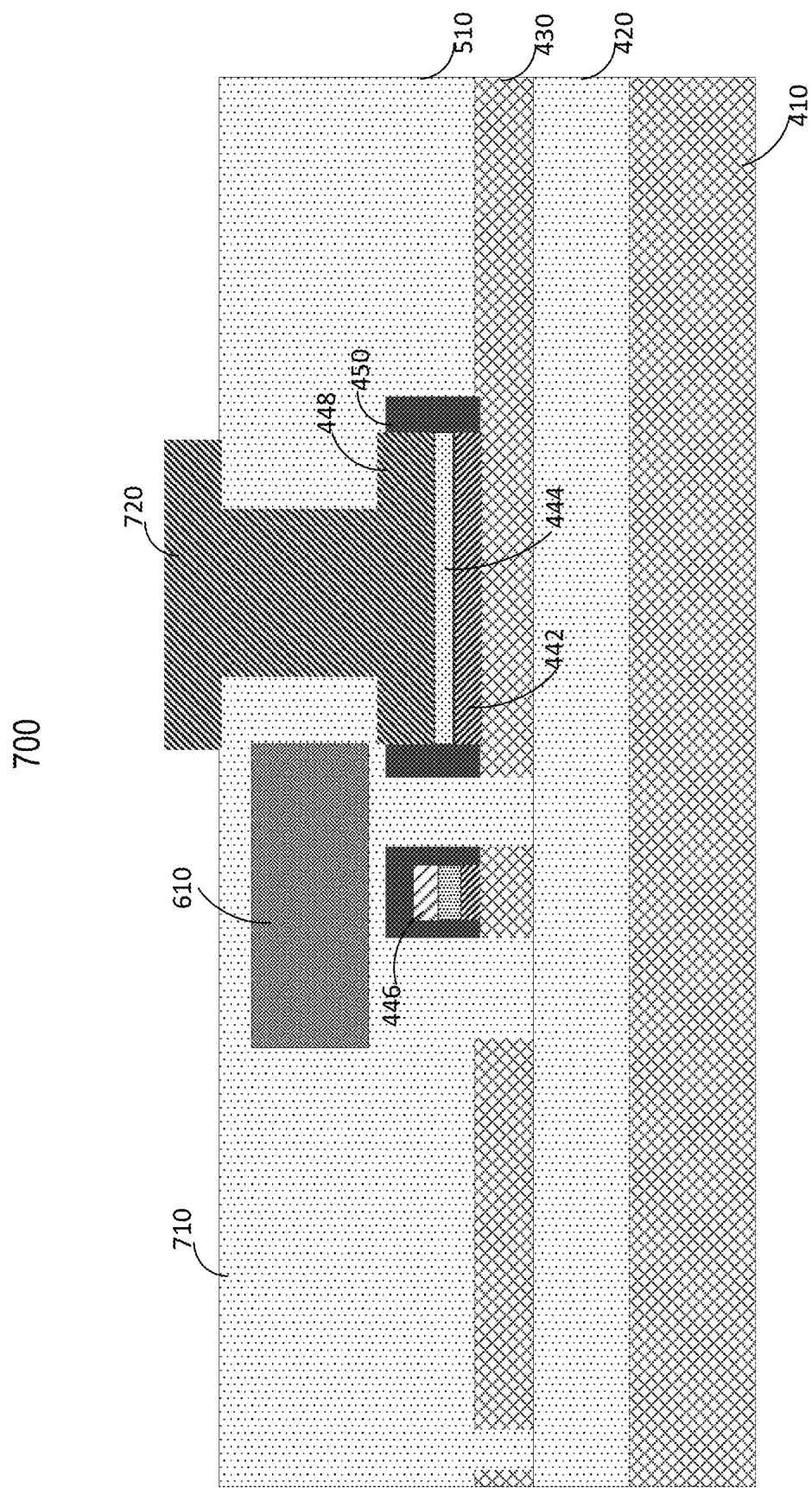
FIG. 7 is a cross-sectional view of an example of a photonic circuit with a sacrificial structure encapsulated by an oxide layer according to certain embodiments.

FIG. 7 is a cross-sectional view of an example of a photonic circuit 700 with sacrificial structure 610 encapsulated in an oxide layer 710 according to certain embodiments. Oxide layer 710 may be a dielectric layer, such as a $SiO_2$ layer, and may be formed using the process described above, for example, at block 340. Oxide layer 710 may be etched in the contact region and the void after the etching may be filled with a metal to form a metal contact 720 that is connected to metal layer 448.

At block 350, an opening may be cut on the second oxide layer to expose the sacrificial structure. The opening may be made by, for example, photolithography and dry or wet etching. In some embodiments, the opening may be sufficiently small such that the surface tension of a fluid may prevent fluid leakage.

At block 360, the sacrificial structure may be etched using, for example, wet chemical etching through the opening. For example, the sacrificial structure may be etched using etchants suitable for etching the material of the sacrificial structure, such as KOH or HF for etching polysilicon or PSG sacrificial structure, where the etchants may be in contact with the sacrificial material through the opening.

Figure 8:
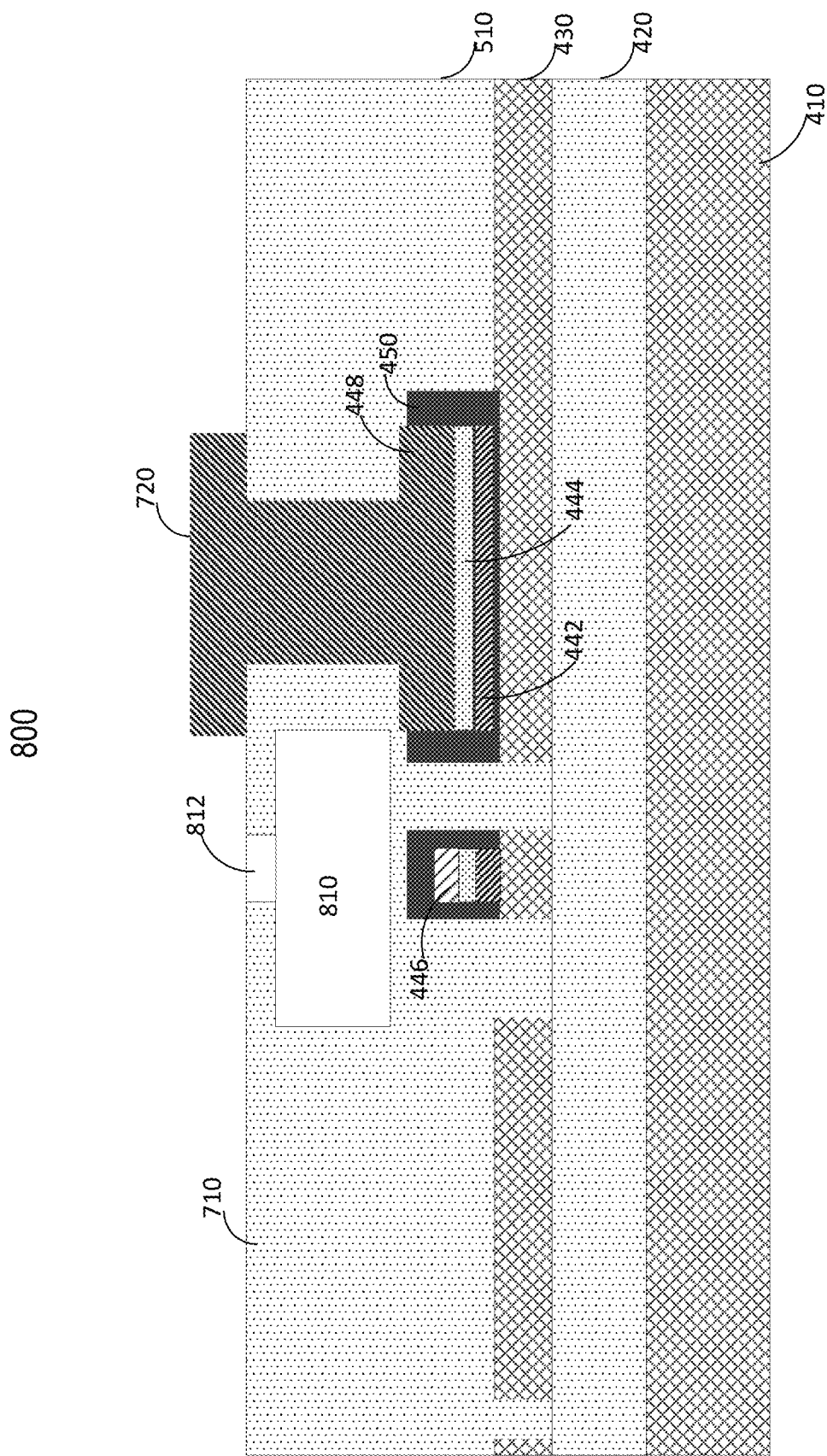
FIG. 8 is a cross-sectional view of an example of a photonic circuit with a sacrificial structure in an oxide layer removed by etching according to certain embodiments.

FIG. 8 is a cross-sectional view of an example of a photonic circuit 800 with the sacrificial structure 610 in oxide layer 710 removed by wet etching according to certain embodiments. As described above at block 350, a small opening 812 may be etched in oxide layer 710 such that etchants may be able to contact the sacrificial material in sacrificial structure 610. An etchant may be added on top of oxide layer 710 at block 360. The etchant may preferentially etch the sacrificial material in sacrificial structure 610, rather than oxide layer 710. The etched sacrificial material may be removed through opening 812 to leave a micro-channel 810 within oxide layer 710 and/or oxide layer 510.

At block 370, the opening on the second oxide layer may be sealed using, for example, a silicon nitride layer. The silicon nitride layer may be deposited on the second oxide layer. Because the opening is small, the silicon nitride layer may fill the opening but may not be deposited in micro-channel 810.

Figure 9:
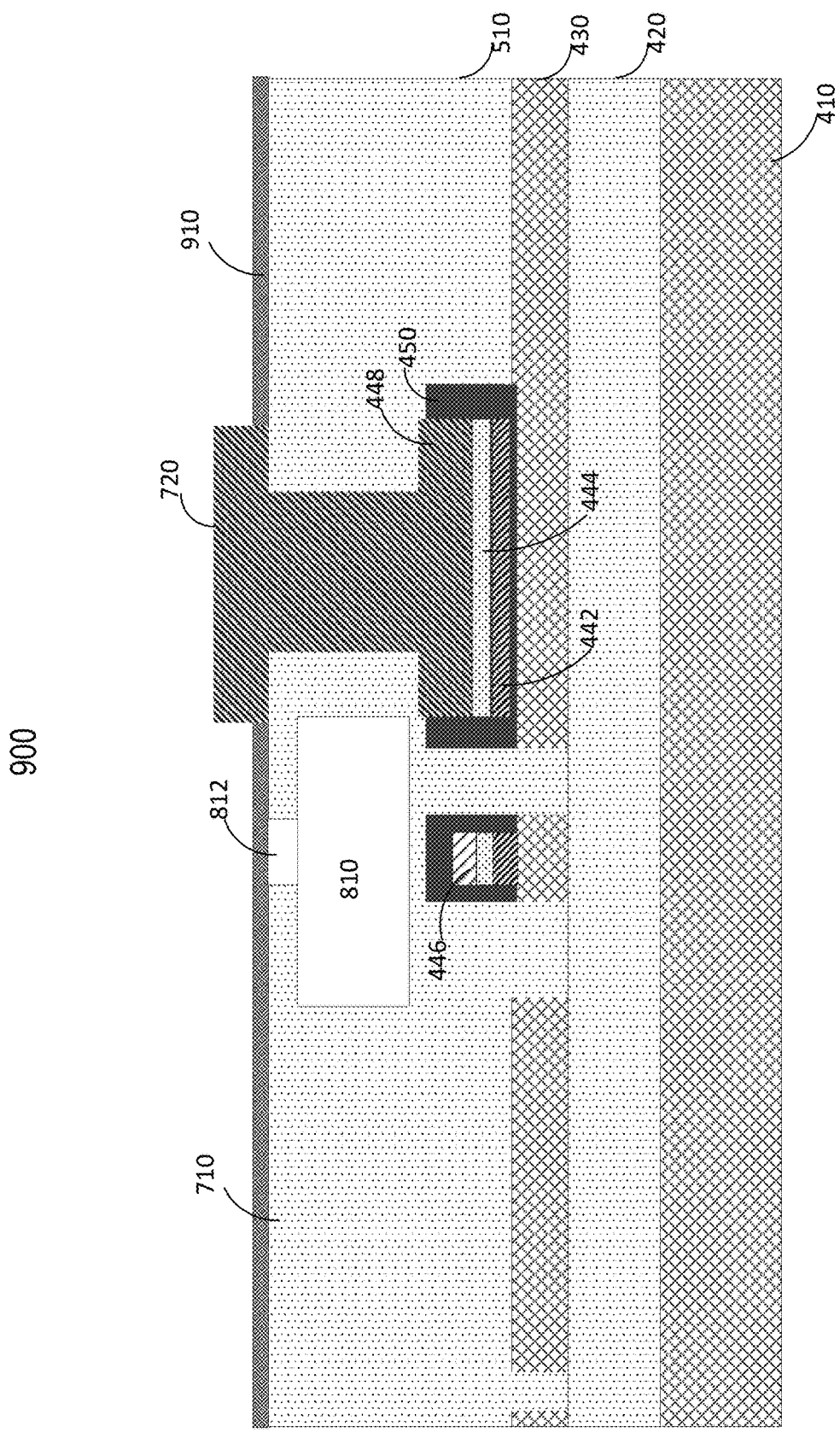
FIG. 9 is a cross-sectional view of an example of a photonic circuit with a micro-channel sealed by a nitride layer according to certain embodiments.

FIG. 9 is a cross-sectional view of an example of a photonic circuit 910 with micro-channel 810 sealed by a thin layer 910 according to certain embodiments. Layer 910 may include, for example, SiN or other materials. Layer 910 and oxide layer 710 and/or oxide layer 510 may fully enclose micro-channel 810 to prevent leakage of the coolant passing through micro-channel 810. An additional dielectric layer, such as an oxide layer, may be formed on layer 910 to cover layer 910.

Figure 10:
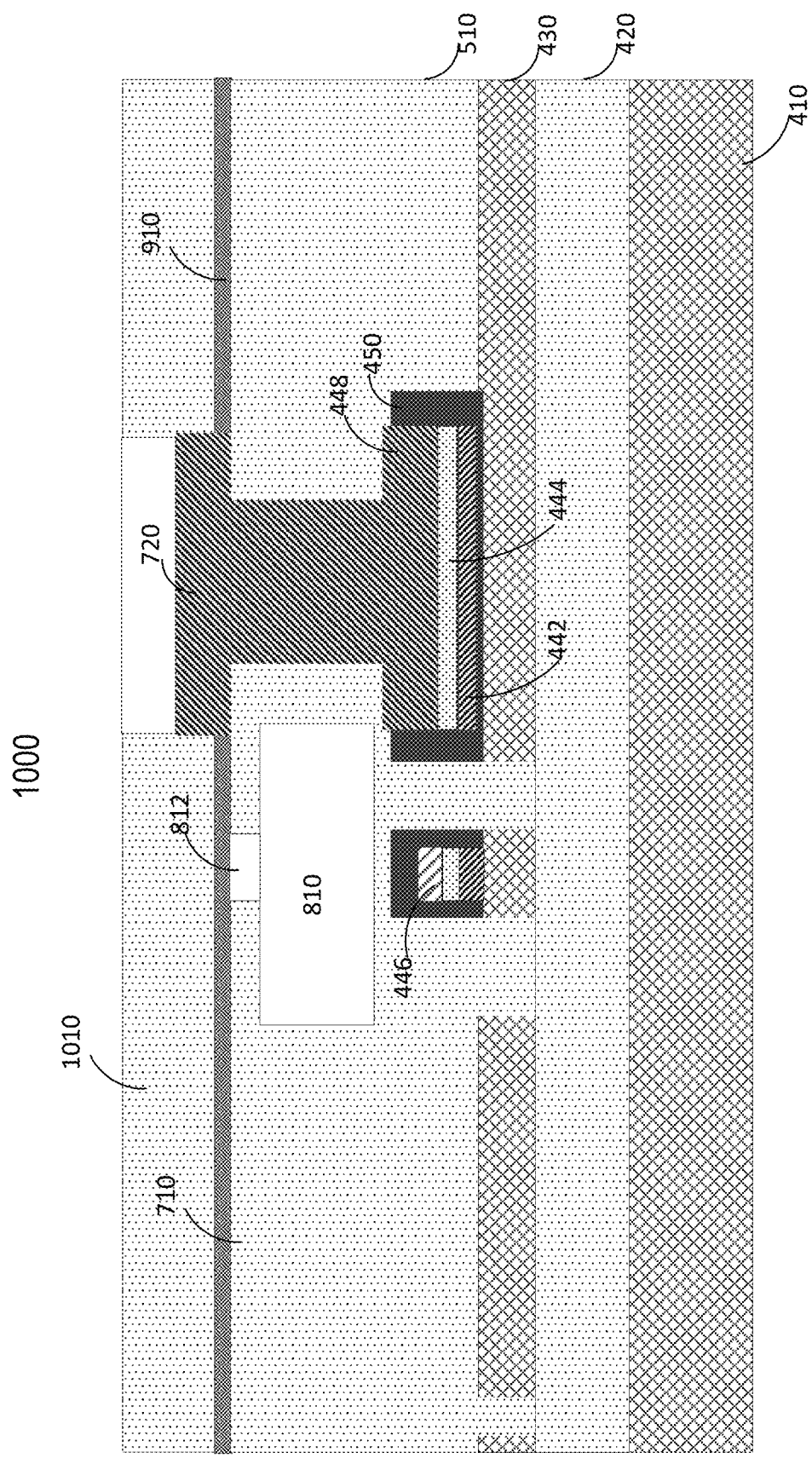
FIG. 10 is a cross-sectional view of an example of a photonic circuit including a micro-channel according to certain embodiments.

FIG. 10 is a cross-sectional view of an example of a photonic circuit 1000 including micro-channel 810 according to certain embodiments. Photonic circuit 1000 may be fabricated using the processes described above with respect to FIG. 3. Photonic circuit 1000 may include a dielectric layer 1010 on layer 910 that seals micro-channel 810. Micro-channel 810 may be in close proximity to the superconducting nanowire of the SNSPD and the metal in the contact region, and thus the thermal resistance between micro-channel 810 and the superconducting nanowire and the thermal resistance between micro-channel 810 and metal contact 720 may be low. Thus, the superconducting nanowire and metal contact 720 can be efficiently cooled by the coolant flowing through micro-channel 810.

Even though only a single micro-channel 810 is shown on a single superconducting nanowire in photonic circuit 1000, multiple micro-channels may be manufactured in photonic circuit 1000 using the techniques described above. For example, in some embodiments, photonic circuit 1000 may include multiple SNSPDs, and multiple micro-channels may be fabricated in photonic circuit 1000, where each micro-channel may be adjacent to an SNSPD. In some embodiments, micro-channels may also be fabricated on top of or adjacent to metal conductors that are connected to the superconducting nanowires to cool down the metal conductors as well.

In some embodiments, the photonic circuit fabricated using the processes described with respect to FIG. 3 may be further processed to form structures for more efficiently injecting the coolant into the micro-channels with small aperture sizes.

Figure 11:
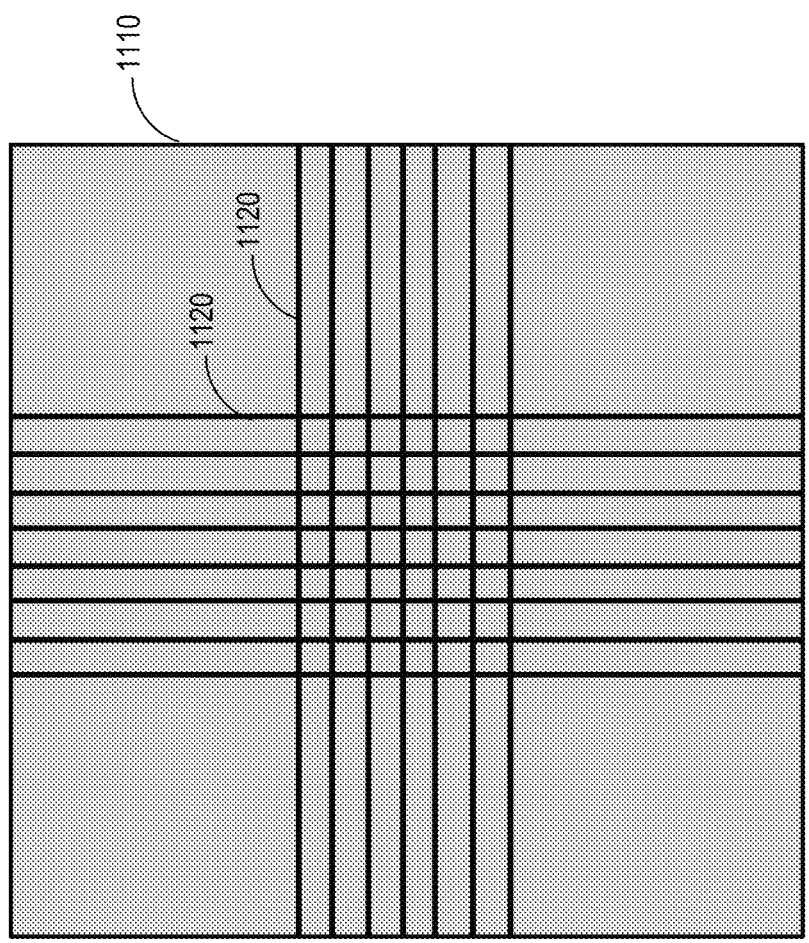
FIG. 11 is a top view of an example of a photonic circuit including multiple micro-channels according to certain embodiments.

FIG. 11 is a top view of an example of a photonic circuit 1110 including multiple micro-channels 1120 according to certain embodiments. Micro-channels 1120 may be fabricated using the processes described with respect to FIG. 3. Micro-channels 1120 may be arranged in any direction as desired. Some micro-channels 1120 may intersect some other micro-channels 1120. In the example shown in FIG. 11, several micro-channel 1120 run in the horizontal direction and several micro-channels 1120 run in the vertical direction. Micro-channels 1120 may intersect at certain locations on photonic circuit 1110. In order to inject the coolant into micro-channels 1120, photonic circuit 1110 may need to be processed to expose micro-channels such that the coolant may be injected into the micro-channels. In addition, some other structures, such as deep trenches and reservoirs may be formed on photonic circuit 1110 to facilitate the injection of coolant into the micro-channels.

Figure 12:
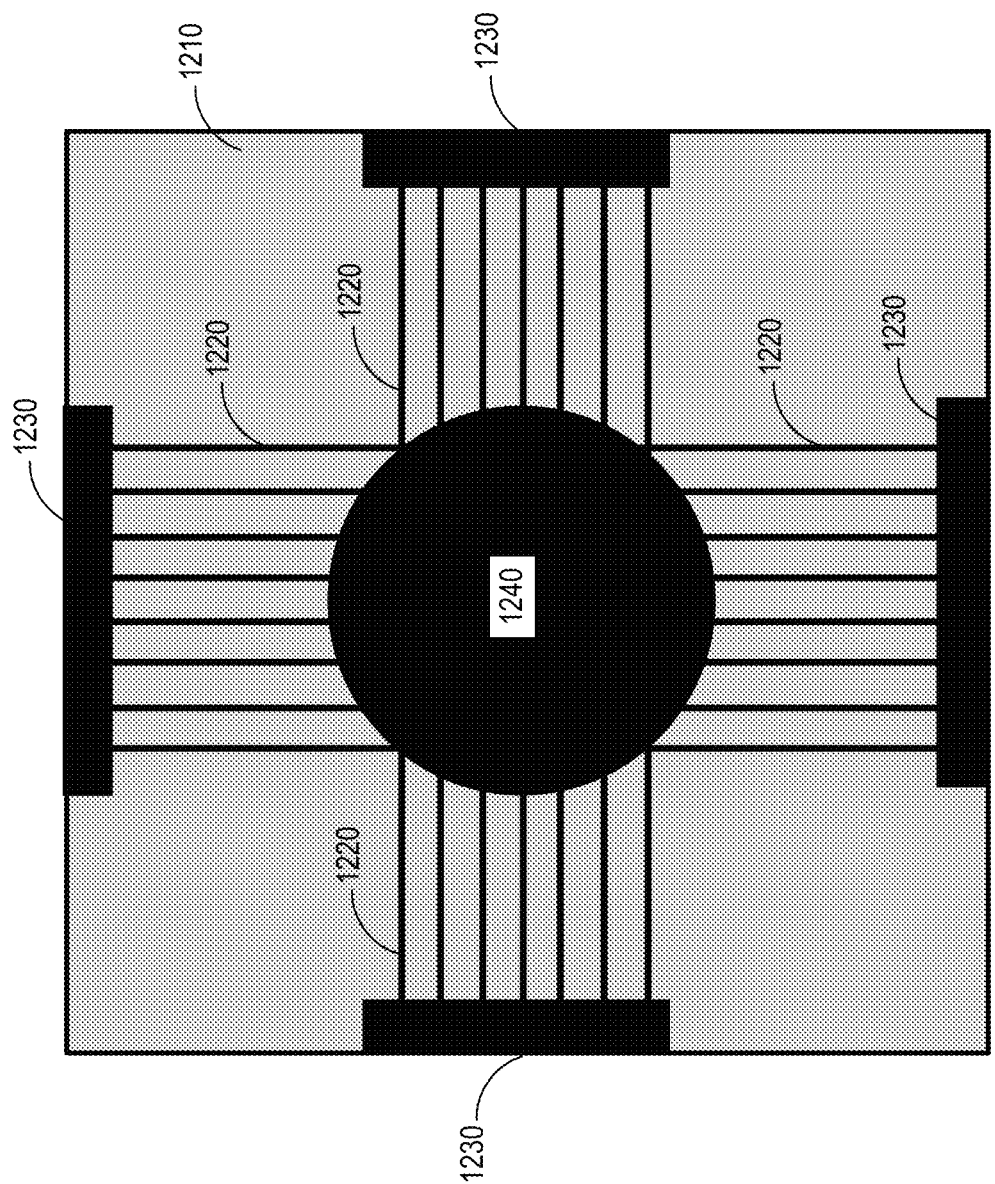
FIG. 12 is a top view of an example of a photonic circuit including micro-channels in fluidic communication with deep trenches according to certain embodiments.

FIG. 12 is a top view of an example of a photonic circuit 1210 including micro-channels 1220 in fluidic communication with deep trenches 1230 and a reservoir 1240 according to certain embodiments. As shown in the example, deep trenches 1230 may be etched or micro-machined at the input and/or output ends of micro-channels 1220. Thus, micro-channels 1220 may be accessible through deep trenches 1230. A reservoir 1240 may be etched or micro-machined at areas where micro-channels 1220 intersect with each other. Thus, micro-channels 1220 may also be accessible through reservoir 1240. Deep trenches 1230 and reservoir 1240 may be used to couple the coolant into and out of micro-channels 1220 in a packaged device as described in detail below.

In some embodiments, photonic circuit 1210 may be bonded to a micro-machined substrate (e.g., a metal plate) and enclosed in a carrier (or receptacle) in a packaged device. In some embodiments, the substrate may be micro-machined to form micro-channels, deep trenches, or reservoirs on the substrate as shown in FIGS. 11 and 12, and may be bonded with the photonic circuit to form conduits for the coolant, such as alternative micro-channels or additional micro-channels.

Figure 13:
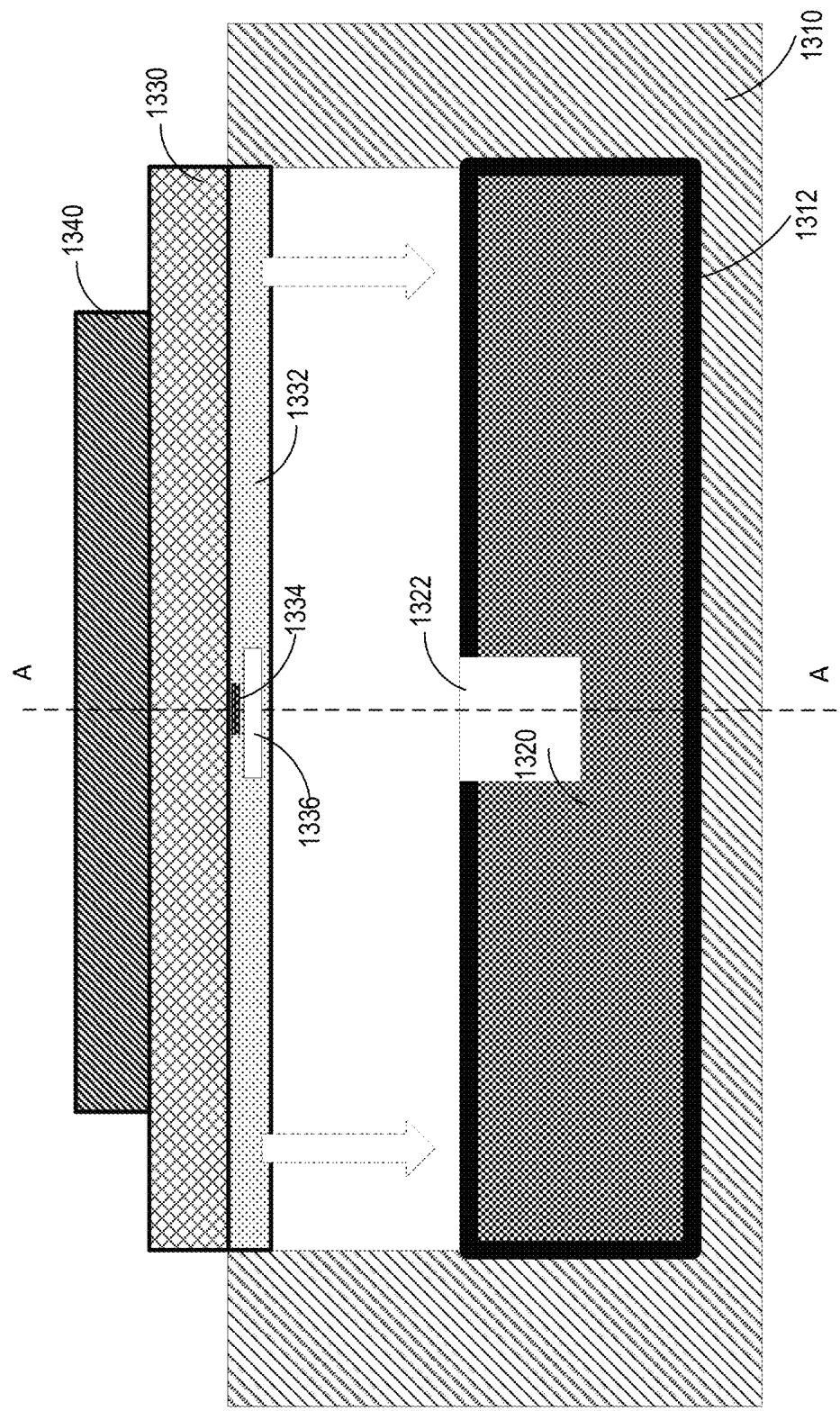
FIG. 13 is a cross-sectional view of an example of bonding a photonic circuit chip to a micro-machined substrate in a carrier according to certain embodiments.

FIG. 13 is a cross-sectional view of an example of bonding a photonic circuit chip 1330 to a micro-machined substrate 1320 in a carrier 1310 according to certain embodiments. In one example, carrier 1310 may be a ceramic carrier or socket. Substrate 1320 may include, for example, a semiconductor wafer, a thermal oxide (e.g., silicon dioxide) layer, a metal plate, and the like. As described above, substrate 1320 may include micro-machined structures, such as micro-channels, deep trenches, or reservoirs (e.g., reservoir 1322). Substrate 1320 may be attached to carrier 1310 by various bonding techniques. Any gaps between substrate 1320 and carrier 1310 may be sealed by a sealant 1312. Photonic circuit chip 1330 may include circuits and devices (e.g., waveguides, single photon detectors, ring oscillators, couplers, switches, metal conductors, etc.) embedded in a dielectric layer 1332. For example, photonic circuit chip 1330 may include a superconducting nanowire 1334 and a micro-channel 1336 embedded in dielectric layer 1332. Photonic circuit chip 1330 may also be bonded to electronic circuits 1340 through, for example, through silicon vias (TSVs). Electronic circuits 1340 may be used to control the photonic circuits in photonic circuit chip 1330, such as tuning a waveguide device, applying a constant current to the SNSPD, or detecting the pulses corresponding to photon absorption. Photonic circuit chip 1330 may be bonded to substrate 1320 by, for example, fusion bonding.

Figure 14:
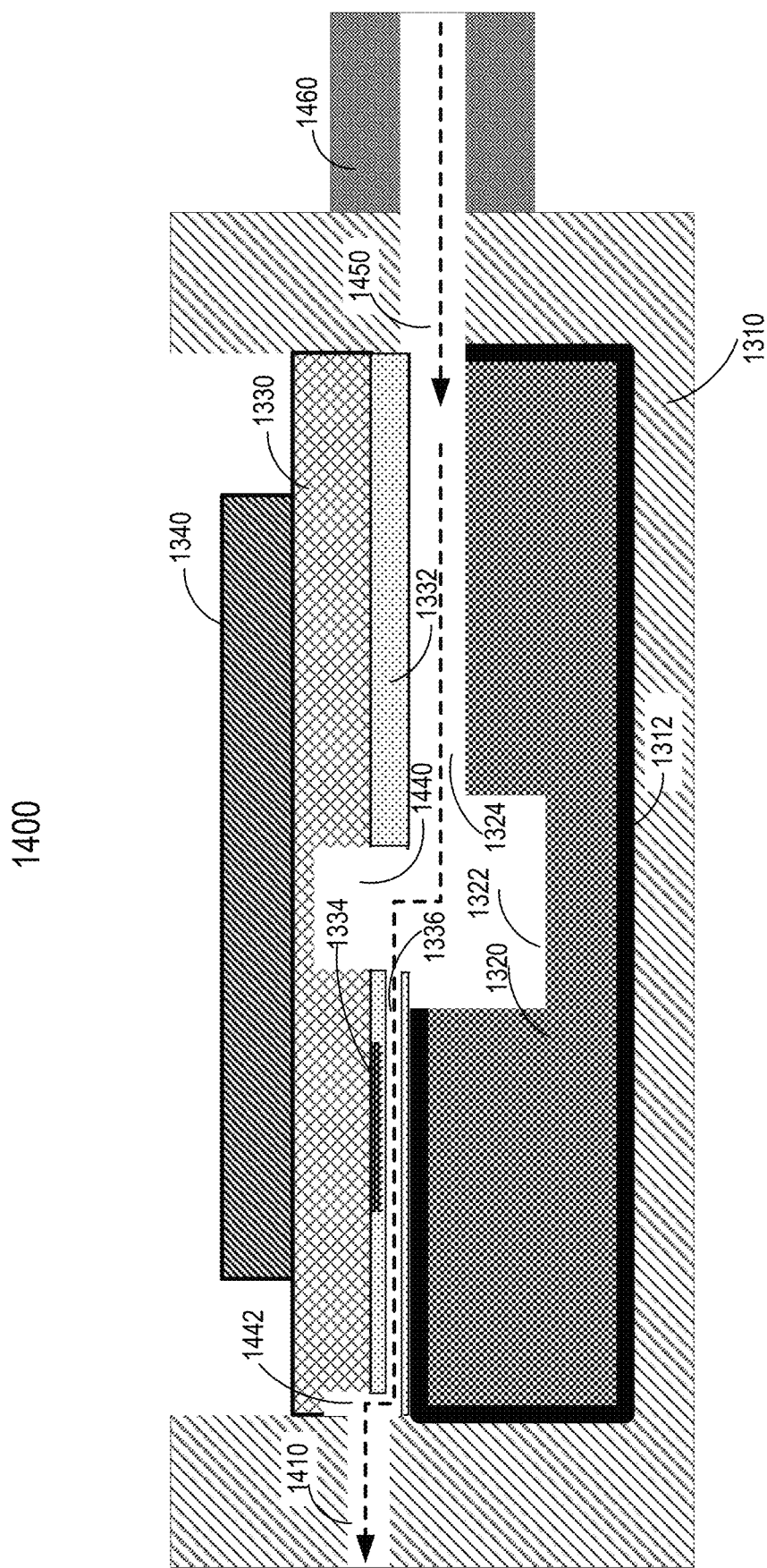
FIG. 14 is a cross-sectional view of an example of a device including a photonic circuit chip bonded to a micro-machined substrate in a carrier according to certain embodiments.

FIG. 14 is a cross-sectional view of an example of a device 1400 including photonic circuit chip 1330 bonded to micro-machined substrate 1320 in carrier 1310 according to certain embodiments. The cross-sectional view of FIG. 14 may show the cross-section of device 1400 along a line A-A shown in FIG. 13. Carrier 1310 may include an output port 1410 and an input port 1450, through which a coolant (e.g., liquid helium) may enter or exit device 1400. For example, liquid helium may be pumped into device 1400 by a pump as described above with respect to, for example, FIG. 2, through a connector 1460 coupled to input port 1450 of device 1400. Photonic circuit chip 1330 may include a micro-machined reservoir 1440 that may be aligned with reservoir 1322 on substrate 1320. Reservoir 1440 may expose micro-channel 1336. FIG. 14 also shows micro-machined channels 1324 in substrate 1320.

Liquid helium may be pumped into reservoir 1322 and 1440 by an external pump through highly insulated tubing/connectors (e.g., connector 1460), input port 1450, and channel 1324. The liquid helium in reservoir 1322 and 1440 may be pushed or attracted into micro-channel 1336 due to the pressure difference built between output port 1410 and reservoir 1322 and 1440 in the tightly sealed and fusion-bonded device 1400. The pressure difference may also cause the liquid helium to flow through micro-channel 1336 and reach a deep trench 1442 in photonic circuit chip 1330 that is coupled to output port 1410. The high pressure inside the micro-channels and reservoirs may help to prevent the liquid helium from boiling as it absorbs heat from photonic circuit chip 1330. Output port 1410 of device 1400 may be aligned with deep trench 1442 to conduct the liquid helium out of device 1400. The liquid helium may be recaptured outside of device 1400 and cooled down as described above with respect to FIG. 2.

As shown in FIG. 14, superconducting nanowire 1334 (e.g., a NbN nanowire) may be adjacent to and aligned with micro-channel 1336. When the liquid helium flows through micro-channel 1336, it may absorb heat from photonic circuit chip 1330, such as superconducting nanowire 1334, to locally cool superconducting nanowire 1334 to a temperature at or below, for example, 4 K. In some embodiments, other parts of device 1400, such as electronic circuits 1340 and other circuits in photonic circuit chip 1330, may be cooled with liquid nitrogen to provide a stable thermal environment for operations of device 1400.

Figure 15A:
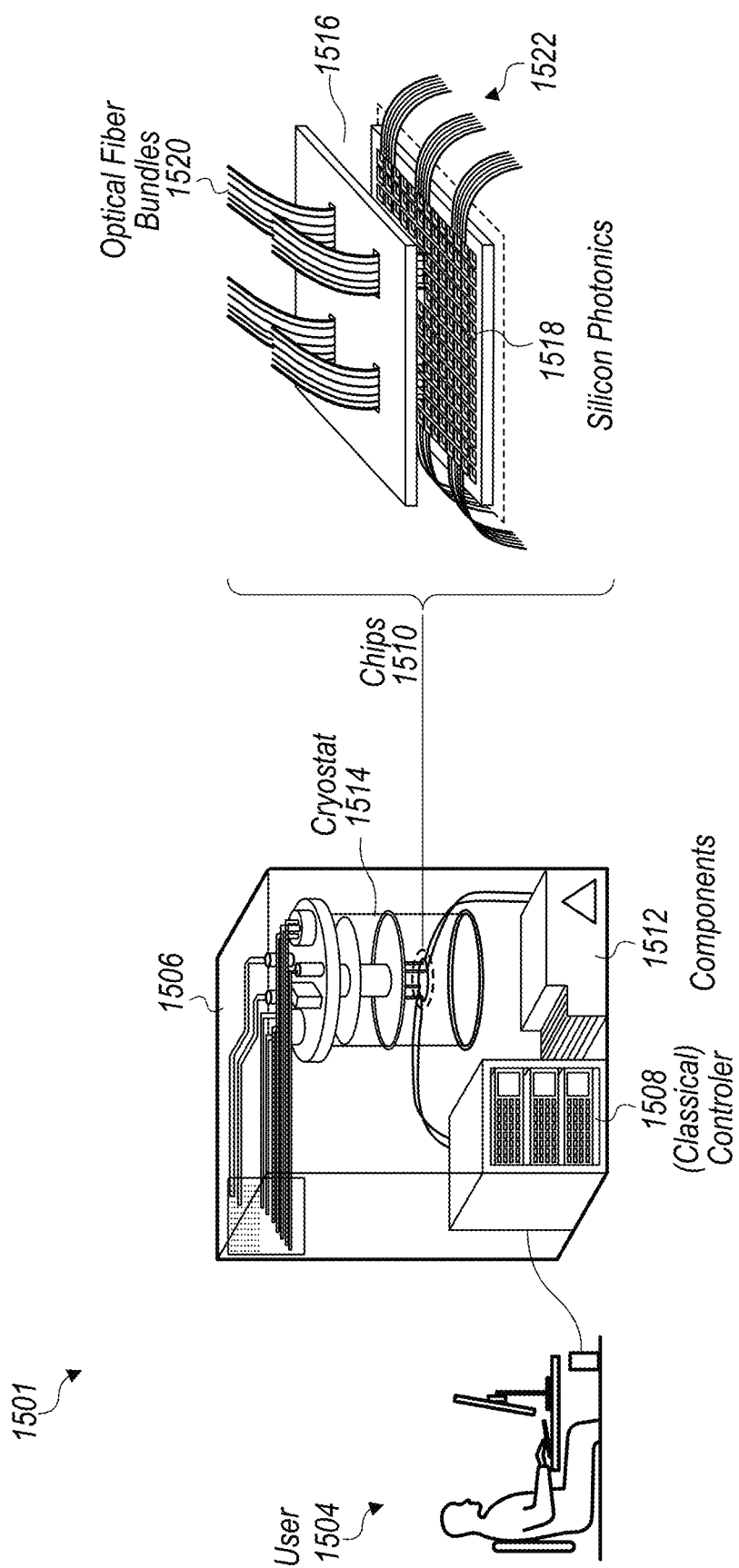
FIG. 15A illustrates an example of a hybrid computing system in accordance with one or more embodiments.

FIG. 15A shows a hybrid computing system in accordance with one or more embodiments. The hybrid computing system 1501 includes a user interface device 1504 that is communicatively coupled to a hybrid quantum computing (QC) sub-system 1506, described in more detail below in FIG. 15B. The user interface device 1504 can be any type of user interface device, e.g., a terminal including a display, keyboard, mouse, touchscreen and the like. In addition, the user interface device can itself be a computer such as a personal computer (PC), laptop, tablet computer and the like. In some embodiments, the user interface device 1504 provides an interface with which a user can interact with the hybrid QC subsystem 1506. For example, the user interface device 1504 may run software, such as a text editor, an interactive development environment (IDE), command prompt, graphical user interface, and the like so that the user can program, or otherwise interact with, the QC subsystem to run one or more quantum algorithms. In other embodiments, the hybrid QC subsystem 1506 may be pre-programmed and the user interface device 1504 may simply be an interface where a user can initiate a quantum computation, monitor the progress, and receive results from the hybrid QC subsystem 1506. Hybrid QC subsystem 1506 further includes a classical computing system 1508 coupled to one or more quantum computing chips 1510. In some examples, the classical computing system 1508 and the quantum computing chips 1510 can be coupled to other electronic and/or optical components 1512, e.g., pulsed pump lasers, microwave oscillators, power supplies, networking hardware, etc. In some embodiments that require cryogenic operation, the quantum computing chips 1510 can be housed within a cryostat, e.g., cryostat 1514. On other embodiments where cryogenic operation is not required, the quantum computing chips 1510, the cryostat 1514 may be replaced with any other enclosure. In some embodiments, the quantum computing chips 1510 can include one or more constituent chips, e.g., hybrid control electronics 1516 and integrated photonics chip 1518. Signals can be routed on- and off-chip any number of ways, e.g., via optical interconnects 1520 and via other electronic interconnects 1522. In addition, the hybrid computing system 1501 may employ a quantum computing process, e.g., measurement-based quantum computing (MBQC), circuit-based quantum computing (CBQC), or any other quantum computing scheme.

Figure 15B:
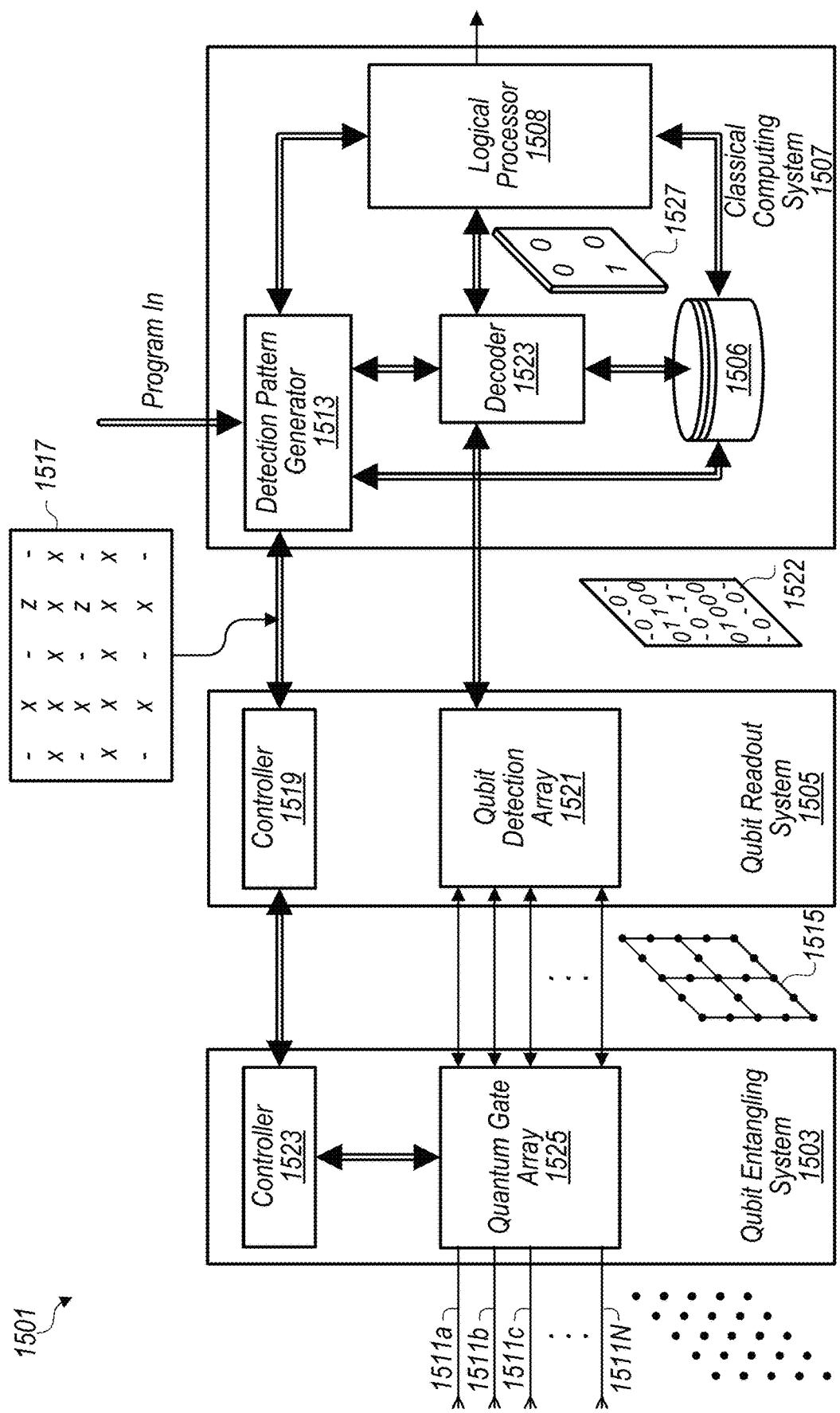
FIG. 15B illustrates a simplified block diagram of an example of a hybrid quantum computing system in accordance with some embodiments.

FIG. 15B shows a block diagram of a hybrid QC system 1501 in accordance with some embodiments. Such a system can be associated with the hybrid computing system 1501 introduced above in reference to FIG. 15A 15. In FIG. 15B, solid lines represent quantum information channels and dashed represent classical information channels. The hybrid QC system 1501 includes a qubit entangling system 1503, qubit readout system 1505, and classical computing system 1507. In some embodiments, the qubit entangling system 1503 takes as input a collection of N physical qubits, e.g., physical qubits 1509 (also represented schematically as inputs 1511a, 1511b, 1511c, . . . , 1511n) and generates quantum entanglement between two or more of them to generate an entangled state 1515. For example, in the case of photonic qubits, the qubit entangling system 1503 can be a linear optical system such as an integrated photonic circuit that includes waveguides, beam splitters, photon detectors, delay lines, and the like. The photon detectors may be any photon detectors described above, such as superconducting nanowire single photon detectors. In some examples, the entangled state 1515 can be a lattice, cluster, or graph state, or one part of a larger lattice, cluster, or graph state that is created over the course of several clock cycles of the quantum computer. In some embodiments, the input qubits 1509 can be a collection of quantum systems and/or particles and can be formed using any qubit architecture. For example, the quantum systems can be particles such as atoms, ions, nuclei, and/or photons. In other examples, the quantum systems can be other engineered quantum systems such as flux qubits, phase qubits, or charge qubits (e.g., formed from a superconducting Josephson junction), topological qubits (e.g., *Majorana* fermions), or spin qubits formed from vacancy centers (e.g., nitrogen vacancies in diamond). Furthermore, for the sake of clarity of description, the term "qubit" is used herein although the system can also employ quantum information carriers that encode information in a manner that is not necessarily associated with a binary bit. For example, qubits can be used in quantum systems that can encode information in more than two quantum states in accordance with some embodiments.

In accordance with some embodiments, the hybrid QC system 1501 can be a quantum circuit-based quantum computer, a measurement-based quantum computer, or any other type of quantum computer. In some embodiments, a software program (e.g., a set of machine-readable instructions) that represents the quantum algorithm to be run on the hybrid QC system 1501 can be passed to a classical computing system 1507 (e.g., corresponding to system 1508 in FIG. 15A above). The classical computing system 1507 can be any type of computing device such as a PC, one or more blade servers, and the like, or even a high-performance computing system such as a supercomputer, server farm, and the like. Such a system can include one or more processors (not shown) coupled to one or more computer memories, e.g., memory 1506. Such a computing system will be referred to herein as a "classical computer." In some examples, the software program can be received by a classical computing module, referred to herein as a detection pattern generator 1513. One function of the detection pattern generator 1513 is to generate a set of machine-level instructions from the input software program (which may originate as code that can be more easily written by a user to program the quantum computer), i.e., the detection pattern generator 1513 can operate as a compiler, logic processor, and/or encoder to allow software programs to be run on the quantum computer. Detection pattern generator 1513 can be implemented as pure hardware, pure software, or any combination of one or more hardware or software components or modules. In some examples, the compiled machine-level instructions take the form of one or more data frames that instruct the qubit readout circuit to make one or more quantum measurements on the entangled state 1515. Measurement pattern 1517 (e.g., a data frame) is one example of the set of measurements and/or gates that should be applied to the qubits of entangled state 1515 during a certain clock cycle as the program is executed. In other examples, e.g., the measurement pattern 1517 can include instructions for applying multi-qubit measurements and/or multi-qubit gates, e.g., in the case where a fusion gate is desired to be applied to two or more qubits or when stabilizer measurements are being performed. In some embodiments, several measurement patterns 1517 can be stored in memory 1506 as classical data. Generally, the measurement patterns 1517 can dictate whether or not a detector from the qubit detection array 1521 of the qubit readout circuit 1505 should make a measurement on a given qubit that makes up the entangled state 1515. In addition, the measurement pattern 1517 can also store which basis (e.g., Pauli X, Y, Z, etc.) the measurement should be made in order to execute the program. In some examples, the measurement pattern 1517 can also include a set of gates that should be applied by the qubit entangling circuit to the next set of physical qubits 1509 that are to be processed at some future clock cycle of the hybrid QC system 1501.

A controller circuit 1519 of the qubit readout circuit 1505 can receive data that encodes the measurement pattern 1517 and generate the configuration signals necessary to drive a set of detectors within the qubit detection array 1521. The detectors can be any detector that can detect the quantum states of one or more of the qubits in the entangled state 1515. For example, for the case of photonic qubits, the detectors can be single photon detectors that are coupled to one or more waveguides, beam splitters, interferometers, switches, polarizers, polarization rotators and the like. In some embodiments, the detectors may include qubit detectors that can perform measurement and/or entanglement operations (e.g., fusion operations) on a single qubit or between the entangled states of two or more qubits. One of ordinary skill will appreciate that many types of detectors may be used depending on the particular qubit architecture.

In some embodiments, the result of applying the detection pattern 1517 to the qubit detection array is a readout operation that "reads out" the quantum states of the qubits in the entangled state 1515. Once this measurement is accomplished, the quantum information stored within the entangled state 1515 is converted to classical information that corresponds to a set of eigenvalues that are measured by the detectors, referred to herein as "measurement outcomes." These measurement outcomes can be stored in a measurement outcome data frame, e.g., data frame 1522 and passed back to the classical computing system for further processing.

In some embodiments, any of the submodules in the hybrid QC system 1501, e.g., controller 1523, quantum gate array 1525, detection array 1521, controller 1519, detection pattern generator 1513, decoder 1533, and logical processor 1508 can include any number of classical computing components such as processors (CPUs, GPUs, TPUs) memory (any form of RAM, ROM), hard coded logic components (classical logic gates such as AND, OR, XOR, etc.) and/or programmable logic components such as field programmable gate arrays (FPGAs and the like). These modules can also include any number of application specific integrated circuits (ASICs), microcontrollers (MCUs), systems on a chip (SOCs), and other similar microelectronics.

As described herein, the logical qubit measurement outcomes 1527 can be fault tolerantly recovered, e.g., via decoder 1533, from the measurement outcomes 1522 of the physical qubits. In the case of a cluster state that is also a stabilizer state, the error syndrome generated by the measurement of joint parity measurements (formed from the combination of one or more stabilizer measurements) are used by the decoder to identify and correct errors so that the correct logical qubit measurement outcome can be determined. Logical processor 1508 can then process the logical outcomes as part of the running of the program. As shown, the logical processor 1508 can feed back information to the detection pattern generator 1513 to affect downstream gates and/or measurements to ensure that the computation proceeds fault tolerantly.

In accordance with some embodiments, it may be beneficial to synchronize, or otherwise coordinate in time, the actions of any or all of the components of the hybrid QC system. Advantageously, one or more embodiments provide systems and methods for clock signal generation and distribution using residual light (i.e., photons) from a train of pulses originating from the pump laser, e.g., housed within electronic and/or optical components 1512 shown in FIG. 15A.

It will be apparent to those skilled in the art that substantial variations may be made in accordance with specific implementations. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In some implementations, operations or processing may involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, compact disc read-only memory (CD-ROM) or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A device comprising:
   a substrate;
   a dielectric layer on the substrate;
   an optical waveguide encapsulated within the dielectric layer;
   a superconducting circuit encapsulated within the dielectric layer and coupled to the optical waveguide; and a micro-channel encapsulated within in the dielectric layer, wherein the superconducting circuit is disposed between the substrate and the micro-channel, and the micro-channel is configured to conduct a liquid at a cryogenic temperature for cooling the superconducting circuit.

2. The device of claim 1, wherein the superconducting circuit includes a photosensitive nanowire.

3. The device of claim 2, wherein the photosensitive nanowire includes a niobium nitride nanowire, a niobium germanium nanowire, or a niobium titanium nitride nanowire.

4. The device of claim 1, wherein the superconducting circuit and the optical waveguide are parts of a single-photon detector or a qubit detector.

5. The device of claim 1, wherein the superconducting circuit is characterized by a superconducting temperature at or below 4 kelvin.

6. The device of claim 1, wherein the superconducting circuit is characterized by a thickness less than 10 nm.

7. The device of claim 1, wherein a distance between the micro-channel and the superconducting circuit is less than 1 µm.

8. The device of claim 1, wherein the micro-channel has a cross-sectional area greater than 10 µm$^2$.

9. The device of claim 1, wherein the micro-channel is characterized by a width that is at least twice of a width of the superconducting circuit.

10. The device of claim 1, wherein the micro-channel is aligned with and adjacent to the superconducting circuit.

11. The device of claim 10, wherein the micro-channel and the superconducting circuit are aligned along an axis normal to the substrate.

12. The device of claim 1, wherein the liquid at the cryogenic temperature is operable to locally cool the superconducting circuit.

13. The device of claim 1, further comprising a reservoir disposed in the dielectric layer, wherein the reservoir is in fluid communication with the micro-channel.

14. The device of claim 13, further comprising a trench disposed in the dielectric layer and an output port, wherein the trench is in fluid communication with the micro-channel and the output port.

15. The device of claim 1, wherein the liquid comprises liquid helium and the device further comprises liquid nitrogen cooling of the substrate.

* * * * *